(12) United States Patent
Ulrich et al.

(10) Patent No.: US 6,434,499 B1
(45) Date of Patent: Aug. 13, 2002

(54) HARD DISC DRIVE VERIFICATION TESTER

(75) Inventors: Scott D. Ulrich, Apple Valley; Cary D. Johnson, Savage; Morse Magnuson, Medina; Peter A. Sherrard, Clear Lake, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/415,598

(22) Filed: Oct. 8, 1999

Related U.S. Application Data

(63) Continuation-in-part of application No. 09/344,474, filed on Jun. 25, 1999.
(60) Provisional application No. 60/090,932, filed on Jun. 26, 1998, and provisional application No. 60/104,478, filed on Oct. 16, 1998.

(51) Int. Cl.[7] .......................... G01M 19/00; G06F 19/00
(52) U.S. Cl. ..................... 702/115; 73/865.9; 702/108; 702/123; 714/42
(58) Field of Search ................ 702/115, 123, 702/108; 73/865.9; 714/42

(56) References Cited

U.S. PATENT DOCUMENTS

| | | | | |
|---|---|---|---|---|
| 4,348,761 A | * | 9/1982 | Berger .......................... 714/718 |
| 4,718,064 A | * | 1/1988 | Edwards et al. ............... 714/28 |
| 4,837,764 A | * | 6/1989 | Russello ....................... 714/46 |
| 4,944,679 A | * | 7/1990 | Allen et al. .................... 434/2 |
| 4,949,036 A | * | 8/1990 | Bezinque et al. ........... 324/212 |
| 4,967,155 A | * | 10/1990 | Magnuson ................... 324/212 |
| 5,361,346 A | * | 11/1994 | Panesar et al. ................ 714/42 |
| 5,390,324 A | * | 2/1995 | Burckhartt et al. ............ 714/23 |
| 5,422,890 A | * | 6/1995 | Klingsporn et al. ........ 714/723 |
| 5,442,305 A | * | 8/1995 | Martin et al. .................. 326/30 |
| 5,644,705 A | * | 7/1997 | Stanley ......................... 714/42 |
| 5,764,545 A | * | 6/1998 | Cannata et al. ............. 702/123 |
| 5,835,703 A | * | 11/1998 | Konno ......................... 714/42 |
| 5,856,624 A | * | 1/1999 | Elsing ........................ 73/865.9 |
| 5,859,358 A | * | 1/1999 | Wood et al. ..................... 73/9 |
| 5,881,221 A | * | 3/1999 | Hoang et al. ................. 714/42 |
| 5,978,751 A | * | 11/1999 | Pence et al. ................ 702/179 |
| 6,094,973 A | * | 8/2000 | Novotny ...................... 73/105 |
| 6,169,413 B1 | * | 1/2001 | Paek et al. .................. 324/760 |
| 6,279,122 B1 | * | 8/2001 | Hitchcock et al. ............ 714/33 |

OTHER PUBLICATIONS

TDB–AC–No. N84091838 "Recording Head Access and Settle Time Test"; IBM Technical Disclosure Bulletin, vol. 27, No. 4A, pp. 1838–1839, Sep. 1984.*
TDB–ACC–No. NN 8801276 "Method and Hardware for the Comprehensive Functional Testing of Interface Controller and Support Circuitry" IBM Technical Disclosure Bulletin, vol. 30, No. 8, pp. 276–281, Jan. 1988.*

* cited by examiner

Primary Examiner—Thomas P. Noland

(57) ABSTRACT

The present invention provides a portable on-site tester to test a disc drive at a location remote from the disc drive manufacturer. The tester supports multiple disc drive interfaces by supporting multiple drive initiator cards, one of which is selected for use at a time. A tester which controls operation of the tester is attached to a local computer via a tester interface. The proper drive initiator card is selected for connection to the tester interface such that the drive initiator card supports the disc drive interface format of the disc drive to be tested. The tester may be configured to support different disc drive interfaces by connection of various drive initiator cards to the tester. The drive initiator cards are mounted to one or more drive initiator card supports, which are oriented in the tester such that the selected drive initiator card is electrically connected to the tester.

11 Claims, 3 Drawing Sheets

HARD DISC DRIVE VERIFICATION TESTER

CLAIM OF PRIORITY

This application is a continuation-in-part of application Ser. No. 09/344,474 filed Jun. 25, 1999, which claimed the benefit of provisional 60/090,932 filed Jun. 26, 1998. This application further claims the benefit of provisional application 60/104,478 filed on Oct. 16, 1998.

FIELD OF THE INVENTION

The invention relates generally to a tester for storage devices, and more specifically to a portable apparatus with self-contained test capability that is operable to test a disc drive.

BACKGROUND OF THE INVENTION

Computer systems commonly utilize hard disc drives as a nonvolatile way to store data. A disc drive is favored for such tasks because it has a high capacity for data, is inexpensive relative to many other storage devices, and is relatively fast when compared to other large and inexpensive data storage devices (such as tape drives). Hard drives also are rewritable—data written to a hard drive may be overwritten or erased, unlike many competing data storage media such as Compact Disc-Recordable (CD-R) devices.

Disc drives usually include one or more discs that are rotated, an actuator that moves a transducer to various locations over the disc surface, and electronic circuitry that processes data to be written to the disc surface. The electrical circuitry also includes control circuitry that controls the operation of the disc drive, and passes information between the disc drive transducer and the computer.

The transducer is typically an electromagnetic transducer housed within a small ceramic block. The transducer assembly is passed over the disc as the disc rotates, and is actuated by magnetic patterns stored on the disc. The transducer assembly encounters high air speeds as a result of the spinning disc, and is typically aerodynamically designed so that it flies over the surface of a spinning disc. The distance between a transducer assembly and a spinning disc in operation can be very small, and currently is typically 1–2 microinches. Alternatively, the transducer assembly may pass through a layer of lubricant, traveling at a similar height over the disc surface.

Information representative of the stored data is encoded on the surface of the disc. The transducers, which incorporate read and write heads, read and write the stored information on the disc when the disc head is accurately positioned over a designated track area of the disc. As the disc spins, the transducer is moved to the correct track by a suspension mechanism that supports the transducer above the disc surface. The suspension mechanism also moves the transducer radially, between the inner and outer portions of the disc, to enable reading and writing to multiple tracks on the disc. Because the transducer must be accurately positioned in very close proximity to the disc to read or write information, much research is done on the characteristics of the transducer-disc interface.

The close tolerances necessary in production of state of the art disc drives contribute to occasional disc drive failure. These drive failures may be due to faulty components, to components or assembly that do not meet engineering specifications, or due to wear or other damage that occurs as a result of drive use or abuse. Because many of these failures occur in drives that have been shipped to customers, manufacturers of disc drives often receive shipments of drives suspected of failure from their customers that have been replaced under warranty with new disc drives.

But, because apparent drive failure may be the result of customer misconfiguration or incompatibility as well as actual drive failure, manufacturers of disc drives typically receive a substantial number of returned disc drives that do not have any evident hardware defect. Computer manufacturers usually do not have the capability to thoroughly test returned disc drives, and so replacement drives are shipped to the customer and the presumed defective drives are returned to the manufacturer. For every drive that is returned to the manufacturer that is not faulty, the disc drive manufacturer incurs the expense of providing a replacement drive to the customer via the computer manufacturer in addition to the expense associated with shipping and testing the presumed defective and replacement drives. But, because the equipment needed to thoroughly test disc drives is often specialized, expensive, and complex, it is not usually practical to provide such equipment to even the largest disc drive customers. Further, the equipment necessary to provide test capability for a varied product line of disc drives is often large and difficult to carry, making on-site testing of disc drives impractical What is needed is a portable and inexpensive testing method and apparatus that will provide economical and efficient testing of returned disc drives so that only the truly defective drives are returned to the manufacturer.

SUMMARY OF THE INVENTION

The present invention provides a portable on-site tester, designed to test a disc drive at a location remote from the disc drive manufacturer. The tester performs tests essentially similar to those performed by the manufacturer, and so is capable of accurately diagnosing disc drive problems without requiring the return of suspected defective disc drives to the manufacturer. The tester supports multiple disc drive interfaces by supporting multiple drive initiator cards, one of which is selected for use at a time.

A tester is attached to a local computer, which controls operation of the tester. A tester interface comprises a part of the tester and is coupled to the local computer and to a selected drive initiator card. The proper drive initiator card is selected for connection to the tester interface such that the drive initiator card supports the disc drive interface format of the disc drive to be tested.

The tester may be configured to support a different disc drive interface by connecting various drive initiator cards to the tester. The drive initiator cards are mounted to one or more drive initiator card supports, which are oriented in the tester such that the selected drive initiator card is electrically connected to the tester.

Disc drives are tested by selecting a drive initiator card that supports the interface of the disc drive to be tested and connecting the selected drive initiator card to the tester. Then, the disc drive is connected to the drive initiator card, and the local computer provides instructions to the tester that control the tests and record the results. In some embodiments, the results of the tests are sent to a networked computer, such as a computer connected to the local computer via a modem connection.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Because disc drive failures often occur after initial verification testing at the manufacturer's facility, these drives must be returned from the field to be tested by either the disc drive manufacturer or the provider of the computer containing the failing disc drive for diagnosis and replacement. But, the tests required to accurately diagnose disc drive failures are complex and require specialized and expensive equipment, and so are not easily performed by most computer manufacturers. This often results in computer manufacturers replacing returned disc drives that are not defective with new disc drives and returning these working disc drives to the manufacturer, causing expense both in replacing a working disc drive and in tracking and shipping disc drives.

The present invention provides a simplified way of performing thorough testing of disc drives remote from a manufacturer's site and providing the resulting data to the manufacturer, so that disc drives suspected to be defective need not be returned to the manufacturer for testing. Furthermore, the present invention allows rapid evaluation of returned disc drives at a computer manufacturer's site or at a customer site, such that the computer manufacturer can quickly test a returned disc drive and return it to the customer if it is not defective rather than replace the returned disc drive with a new drive.

Figure 1:
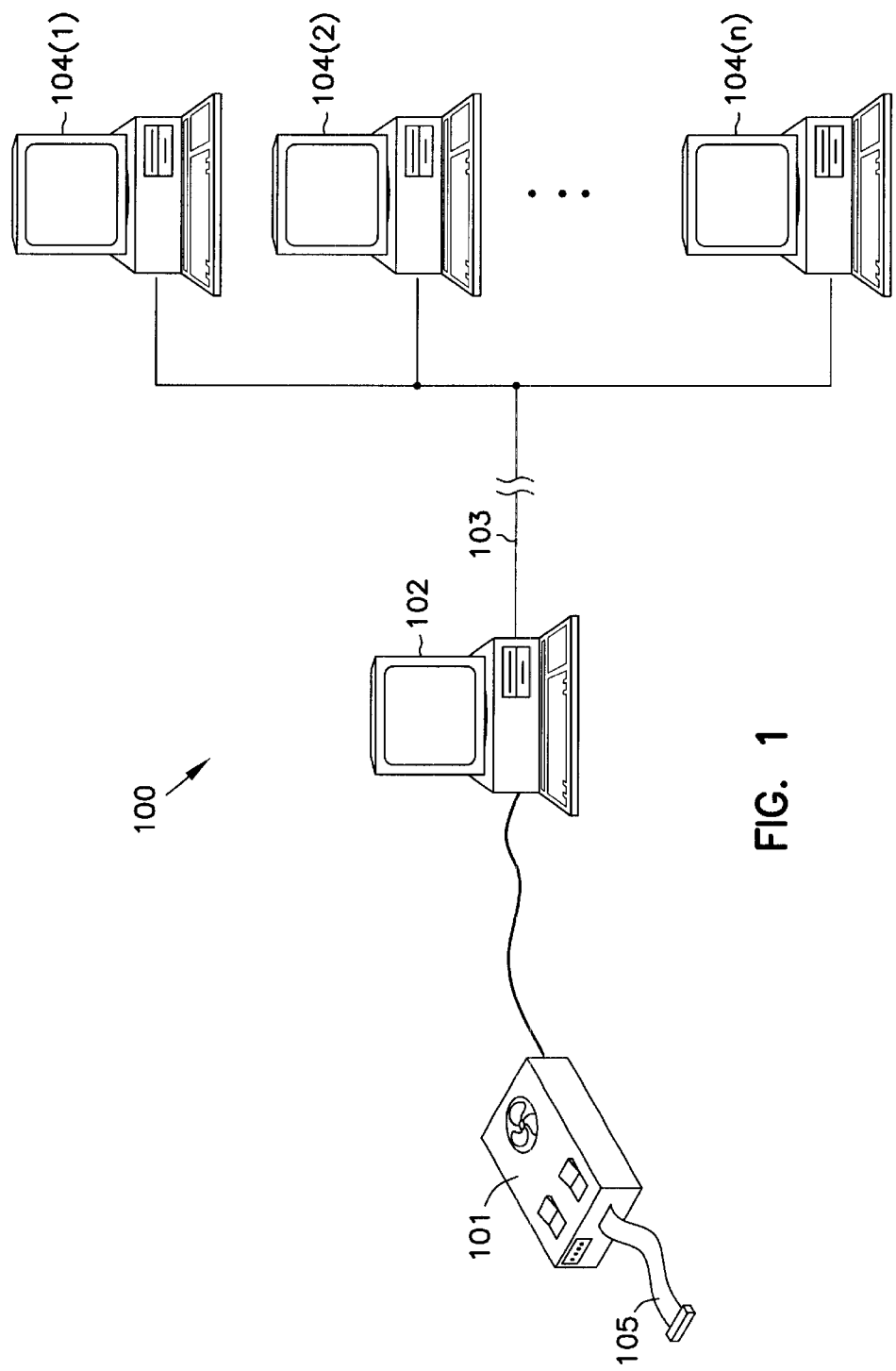
FIG. 1 shows a tester connected to a local computer, which is attached to a network, consistent with an embodiment of the present invention.

Referring to FIG. 1, the on-site verification tester is shown at 101. The tester is connected to a local computer 102, which is in some embodiments connected via a network connection 103 to a remote network of computers 104. The local computer is connected to the tester 101 such that it can control the operation of the tester, and is connected in some embodiments via a network connection such as a phone connection to the remote network computers 104 such that it can exchange data over the network connection with these networked computers 104. The local computer, tester, and networked remote computer form test apparatus 100. In a further embodiment, local computer 102 is a laptop computer, capable of being easily transported by a user for off-site testing.

In operation, a computer manufacturer or other customer facility remote from the disc manufacturer operates the tester 101 and the local computer 102. One or more disc drives to be tested are connected to the tester 101 via a drive interface connection 105. Control software is loaded on the local computer and facilitates communication between the local computer 102 and the tester 101. The control software of some embodiments also communicates the results of the test and related information over the network connection 103 to the remote network of computers 104. The network of remote computers 104 are, in one embodiment, computers at a computer manufacturing site that are used to record and analyze drive failure information. The remote computers may also be remote computers of the computer manufacturer or other computers that perform similar data storage or analysis functions.

The tester 101 of one embodiment has within it one or more drive initiator cards that are printed circuit boards with logic that conveys instructions to test the disc drives connected via drive interface connection 105. The drive initiator cards contain the logic and programs that actually provide the test instructions to the disc drive under test, but do so under the direction of the local computer 102. The drive initiator cards also report the results of the test for each drive tested to the local computer 102. These results may be stored on the local computer as well as sent via network connection such as via a modem to the remote networked computers. The drive initiator cards in a further embodiment are mounted within the tester 101 such that any single drive initiator card can be connected to a disc drive under test and to the local computer at any one time. The local computer in a further embodiment controls a power supply for each disc drive under test, such that the power supply voltages applied to the disc drive can be varied during test.

Tests performed by the tester may include any type of test, but will specifically include those tests commonly performed by the disc drive manufacturer for disc drive verification. It is intended that the tester be capable of performing the same tests the disc drive manufacturer would perform if the disc drive were returned to the manufacturer site, but that the tester be operable to perform these tests at a remote customer location. Such tests will include in various embodiments a self-diagnostic test and firmware revision check of the disc drive, read/write tests, disc drive log downloading and evaluation, and read verification of the disc drive as well as other similar tests intended to verify proper operation of a disc drive under test. The test process of a further embodiment will also include downloading new firmware to the disc drive under test if it is determined that the firmware revision on that disc drive requires updating.

The drive interface connection 105 physically provides a connection for a single disc drive, but may in further embodiments provide multiple connections to multiple disc drives simultaneously via a drive interface connector comprising a single drive interface cable with multiple disc drive connectors thereon. For example, embodiments employing a SCSI interface may have a single SCSI cable with multiple SCSI connectors for testing multiple drives, and embodiments with a fiber channel interface may support multiple fiber channel disc drives in a single fiber channel loop.

Figure 2:
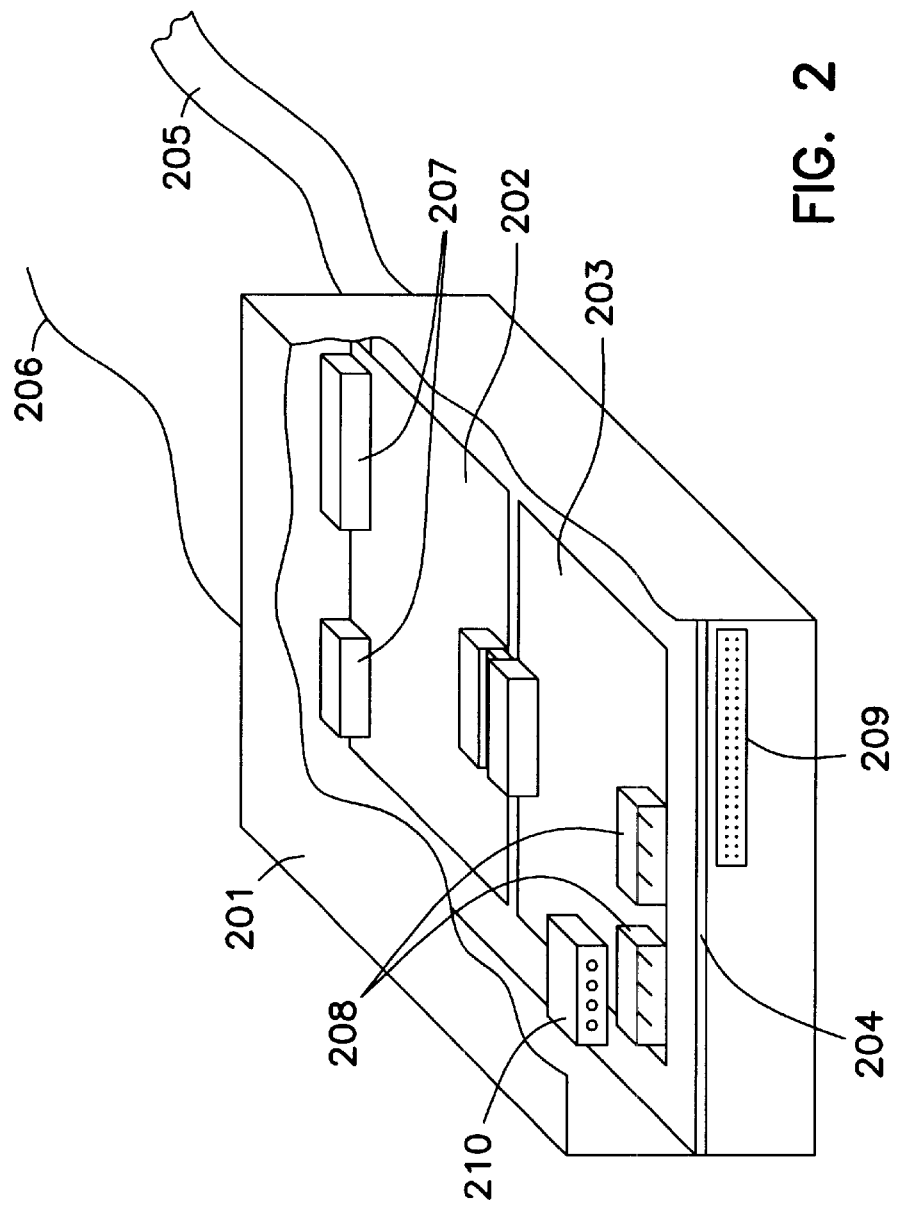
FIG. 2 shows a tester attached to a disc drive under test, consistent with an embodiment of the present invention.

A more detailed view of a tester 101 is shown in FIG. 2. In FIG. 2, only one bay 201 is shown in the tester 202 for the purpose of clarity. The tester comprises a drive initiator card 202 coupled to a drive interface card 203, both of which are mounted to an initiator card support 204. The drive initiator card 202 is connected to a serial interface card that provides communication via serial connection 205, and is connected to power supplied via power connection 206 via connectors such as are shown at 207. In a further embodiment, the drive initiator card support 204 may be removed so that connectors 207 disconnect the drive initiator card from the serial interface and power, and inverted such that a drive initiator card and drive interface card mounted on the opposite side of the drive initiator card support may be used to support a different drive interface in the same tester.

In FIG. 2, this is shown by fibre channel connectors 208 mounted to the drive interface card 203 which is connected to a fiber channel drive initiator card 202 to provide testing capability for fiber channel disk drives. The opposite side of the drive initiator card support 204 contains a drive initiator card similar to 202 but that supports a SCSI interface, and further contains a drive interface card that supports connection to SCSI disc drives via the SCSI connector shown at 209.

Each drive interface connector such as fiber channel connectors 208 and SCSI connector 209 must be of a specific type and geometry to interface with a specific type of disc drive. Typically, a cable is connected between similar connectors on the disc drive and on the drive interface card 203, providing an electrical, optical, or other connection providing communication between the disc drive and the drive interface card. The drive initiator card must further support the interface physical format and communications specifications of the disc drives to be tested, thereby requiring unique drive initiator cards, unique drive interface cards, and unique drive interface connectors for different types of disc drive interfaces. into the bay. The power connector 210 is of a standard type, but may be vary in some embodiments if needed to interface with new or specialized disc drive devices. But, a variety of formats for drive communication protocol and physical interface already exist and are widely used, and must be distinguished between in designing a tester.

Three types of Small Computer System Interface (SCSI) connector are currently in use, and are not physically compatible. For example, the various connectors contain 50 pins in some SCSI-I and SCSI-II variations, contain 68 pins in all Wide SCSI variations, and contain 80 pins in the Single Connector Attachment (SCA) SCSI variation. Because a 68-pin connector will not interface with an 80-pin or 50-pin connector, each specific connector type must be matched to the disc drive used in that bay. Also, the SCA SCSI interface incorporates power connections in the drive interface connection 204, and so no separate power connector 203 is necessary. Further, Low-Voltage Differential (LVD) variations of SCSI exist, and LVD SCSI must be supported by the drive initiator card interface to each bay that will be used to test LVD SCSI disc drives.

Additionally, Integrated Drive Electronics (IDE) or AT Attachment (ATA) drives communicate via a 40-pin drive interface connector, and use a communications standard very different in nature from SCSI. These IDE drives also require a standard power connection to supply power to the drive, in addition to the interface connection. IDE drives are typically not used in high-end disc drive applications, and so are less likely to be supported in a tester configuration than SCSI variations. However, Fiber Channel SCA attachments are in commercial use for high-end disc drives, and rely in various embodiments on a 3-pin connector to convey data and a standard power connector such as 210 to convey power, or on a single unique 40-pin connector to convey both data and power to the disc drive. It is anticipated that most testers consistent with this invention will support multiple drive initiator card types and drive interface types, such as is shown by the tester of FIG. 2. Future high-performance disc drive attachments and protocols may be developed, and are also to be considered as drive interface options consistent with the present invention.

The tester may utilize in a further embodiment multiple drive initiator card supports 204 with various drive initiator cards 202 and different drive interfaces supported thereon, so that a user may not only invert and reinsert a drive initiator card support in the tester to change between two drive interface formats, but can also include and utilize additional drive interface card supports. For example, a tester may be provided with two drive initiator card supports, each of which has two drive initiator cards mounted thereon, allowing the user to choose between any of the four supported drive interface formats for disc drive testing.

The drive initiator card attached to each bay in one embodiment will support all interfaces and communication protocols necessary to communicate with the different drive types that may be supported by a single drive connector and protocol. For example, a single drive initiator card may support any one of 50-pin SCSI, 68-pin SCSI, fast SCSI, ultra SCSI, or other SCSI variants, and must have appropriate drive initiator card programming to support and test each of these types of drives in their respective bays. A preferred embodiment of the tester anticipated for production will be configured to support a variety of SCSI protocols with one drive initiator card, and a fiber channel interface protocol with a second drive initiator card mounted on the opposite side of the drive initiator card support.

In a further embodiment a connection is made between the local computer and the disc drive under test. This connection provides for communication for controlling selected tests and for other functions, and is made between the local computer and a selected disc drive via a controller card comprising part of the tester. The connection of one embodiment can further be employed to program a memory that comprises part of the disc drive under test, and to read or write other data to the disc drive. In one embodiment, the connection is a serial connection between the local computer and the drive under test.

The present invention provides a tester providing portable and affordable test capability for a variety of disc drives. The tester incorporates a drive initiator card capable of communication with the local computer. This tester is particularly well suited for field service, due to the small size of a tester that supports only one disc drive interface at a time. The tester in one embodiment has no disc drive bay but still electronically supports a single disc drive, simply providing an electrical connection from which a cable can be connected between the tester and a disc drive to be tested. This allows testing of a disc drive still mounted in a system or on a table top, and further improves size and portability of such a tester intended for field use. The tester in one embodiment will have an initiator card that supports SCSI disc drives and an initiator card that supports fiber channel disc drives, so that the tester is capable of testing all current high-end disc drive products of the manufacturer. It is anticipated that new disc drive interface formats will be developed, and incorporation of support for these formats into a tester as described herein is to be considered within the scope of this invention.

Figure 3:
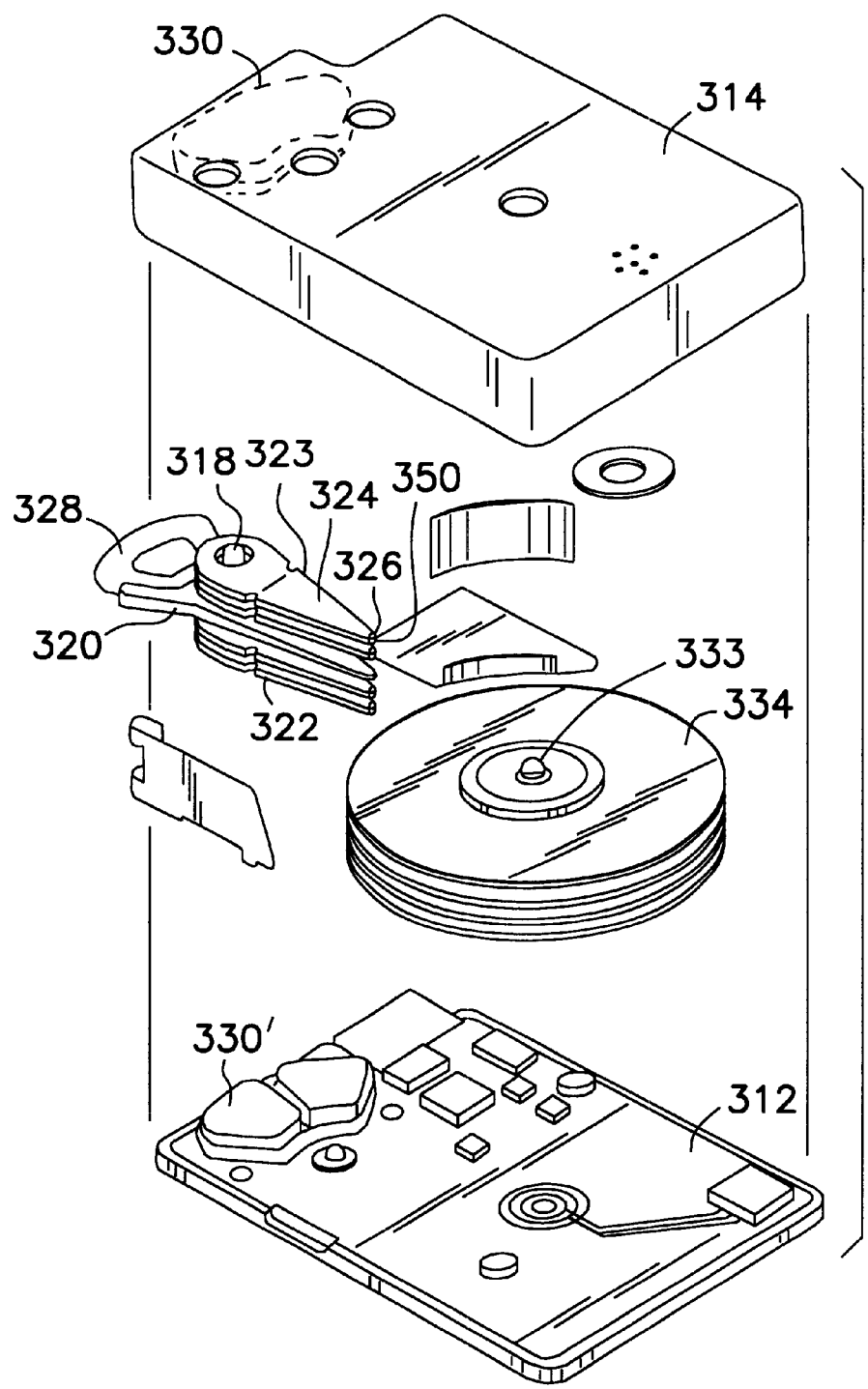
FIG. 3 shows a disc drive assembly, as may be tested by the present invention.

The invention described herein is operable to test one or more disc drives, as illustrated at 300 in FIG. 3. This exemplary drive has a housing or base 312 and a cover 314 that form a disc enclosure. An actuator assembly 320 is attached to base 312 and pivots about actuator shaft 318. The actuator assembly includes a plurality of combs 322 onto which arms 323 with load beams 324 are mounted. These load springs each support a slider 326 that carries a magnetic transducer 350, which in combination are often known as a head. A voice coil 328 is located on the actuator assembly opposite from the head, and along with voice coil magnets 330 forms a motor that actuates the actuator assembly about the actuator shaft 318. A spindle motor is also mounted to the base 312, and comprises in part a rotating spindle hub 333. In this particular embodiment, the spindle motor is located within the spindle hub, and so is not visible. The spindle hub supports and rotates a number of discs 334, onto which data is stored and read.

The present invention provides a remotely-operable tester, designed to test multiple disc drives utilizing different interfaces simultaneously. The tester performs tests essentially similar to those performed by the manufacturer, and so is capable of accurately diagnosing disc drive problems without requiring the return of suspected defective disc drives to the manufacturer. The tester is attached to a local computer which controls operation of the tester and in some embodiments communicates test results via a network connection to one or more other networked computers. The tester may be configured to support different drive interface formats by use of different drive initiator cards and drive interface cards, which provide communication between the serial connection to the local computer and the disc drive under test.

CONCLUSION

In one embodiment, a disc drive test apparatus 100 includes a tester 101. The tester is connected to a local computer 102 that is operable to control the tester. A tester interface provides connection via a serial connection 205, communicatively coupling the tester 201 to the local computer 102. The tester further includes one or more drive initiator cards 202, one of which is connected at any time to the tester interface. In some embodiments, the local computer 102 communicates test results to networked computers 104, via a network connection 103 such as a modem connection. Some embodiments also include a drive initiator card support 204 onto which one or more drive initiator cards 202 are mounted, such that one of the drive initiator cards is operatively coupled to the tester interface by inserting the drive initiator card support into the tester in a first orientation, and a second drive initiator card mounted to the drive initiator card support is operatively coupled to the tester interface by inserting the drive initiator card into the tester in a second orientation. In a further embodiment, each of the one or more drive initiator cards supports a different disc drive interface. In other embodiments, the test apparatus further comprises a programmable power supply connected to the one or more disc drives under test and is operable to vary the voltage supplied to the one or more connected disc drives. In a further embodiment, the programmable power supply is operable to conduct a four-corner margins test on the one or more disc drives under test.

In an embodiment, a disc drive is tested by configuring a tester 201 to support a desired disc drive interface 208 or 209 by connecting a drive initiator card supporting the desired interface to a tester which is further connected to a local computer 102. A disc drive is then connected to the tester 201, and tests are initiated by providing instructions to the tester via the local computer. The tester then provides results of the tests to the local computer. In a further embodiment, the local computer 102 provides the test results to networked computers 104 via a network connection 103 such as a dial-in modem connection or internet connection.

In some embodiments, a test apparatus 100 further includes a direct connection between the local computer 102 and one or more disc drives, such that the local computer can communicate directly with the one or more disc drives under test.

An embodiment of the disc drive test apparatus 100 of the invention includes a tester 201 with a plurality of drive initiator cards 202, and a drive initiator support card 204 with at least two of the plurality of drive initiator cards mounted thereon. A drive initiator card 202 is selected for connection to the tester by inserting the drive initiator support card into the tester in an orientation corresponding to the selected drive initiator card.

We claim:
1. A disc drive test apparatus, comprising:
   a tester;
   a local computer connected to the tester, the local computer operable to control the operation of the tester;
   a tester interface comprising part of the tester and communicatively coupled to the local computer; and
   one or more drive initiator cards, at least one of which comprises part of the tester and is communicatively coupled at any time to the tester interface and which is operable to execute machine-readable instructions that perform one or more tests on one or more connected disc drives.

2. The test apparatus of claim 1, wherein the local computer is further operable to communicate test results to a remote computer via a network connection.

3. The test apparatus of claim 2, wherein the network connection is a dial-in modem connection.

4. The test apparatus of claim 1, wherein the disc drive test apparatus further comprises a disc drive initiator card support, wherein two of the at least one drive initiator cards are mounted to the drive initiator card support, such that one of the drive initiator card selected from the two drive initiator cards mounted to the drive initiator card support is operatively coupled to the tester interface when the drive initiator card support is in a first orientation and the other of the drive initiator cards is operatively coupled to the tester interface when the drive initiator card support is in a second orientation.

5. The test apparatus of claim 4, wherein the drive support card is changed between the first orientation and second orientation by inverting the drive initiator support card.

6. The test apparatus of claim 1 which further comprises a drive initiator support with a plurality of the drive initiator cards mounted thereon, wherein a selected drive initiator card is oriented to face a specified surface of the tester before the drive initiator card support is inserted in the tester, so that the selected drive initiator card is properly aligned with electrical connections of the tester interface within the tester and will be electrically connected upon proper insertion of the drive initiator card support into the tester.

7. The test apparatus of claim 1, further comprising a programmable power supply connected to at least one disc drive under test and operable to vary voltage supplied to the at least one connected disc drive.

8. The test apparatus of claim 7, wherein the programmable power supply is directed to perform a 4-corner margins test on the at least one disc drive under test.

9. The test apparatus of claim 1, wherein each of the at least one drive initiator cards supports a different disc drive interface.

10. The test apparatus of claim 1, further comprising a connection between the local computer and one or more disc drives under test, operable to provide communication between the local computer and the disc drives.

11. The disc drive test apparatus of claim 1, wherein each of the one or more drive initiator cards when communicatively coupled between the tester interface and at least one disc drive under test provides a different interface between the drive initiator card and the disc drive under test, such that the drive initiator cards provide tester support for multiple disc drive interfaces.

* * * * *